United States Patent
Kruglick

(10) Patent No.: US 8,909,157 B2
(45) Date of Patent: Dec. 9, 2014

(54) OPTIMIZING CELL TRAFFIC LOAD AND INTERFERENCE THROUGH HIGH INTERFERENCE INDICATORS

(75) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 0 days.

(21) Appl. No.: 13/142,280

(22) PCT Filed: Apr. 29, 2011

(86) PCT No.: PCT/US2011/034498
§ 371 (c)(1),
(2), (4) Date: Jun. 26, 2011

(87) PCT Pub. No.: WO2012/148414
PCT Pub. Date: Nov. 1, 2012

(65) Prior Publication Data
US 2014/0038631 A1  Feb. 6, 2014

(51) Int. Cl.
| | | |
|---|---|---|
| H04W 4/00 | (2009.01) |
| H04W 72/00 | (2009.01) |
| H04B 1/00 | (2006.01) |
| H04B 15/00 | (2006.01) |
| H04B 7/14 | (2006.01) |
| H04J 1/16 | (2006.01) |
| H04J 3/14 | (2006.01) |
| H04L 12/26 | (2006.01) |
| H04L 12/28 | (2006.01) |
| H04L 12/16 | (2006.01) |
| H04W 40/16 | (2009.01) |
| H04W 72/04 | (2009.01) |
| H04W 28/26 | (2009.01) |
| H04W 84/04 | (2009.01) |

(52) U.S. Cl.
CPC .............. *H04W 40/16* (2013.01); *H04W 72/04* (2013.01); *H04W 72/0426* (2013.01); *H04W 28/26* (2013.01); *H04W 84/047* (2013.01)
USPC .......... 455/63.2; 455/9; 455/452.2; 455/63.1; 455/453; 370/315; 370/246; 370/252; 370/328

(58) Field of Classification Search
CPC ... H04B 7/2606; H04J 11/005; H04L 5/0007; H04L 5/0062; H04L 5/0073; H04W 24/02; H04W 52/243; H04W 52/46
USPC .......... 370/315, 246, 252, 328; 455/9, 452.9, 455/452.2, 63.1, 63.2, 453
See application file for complete search history.

(56) References Cited

U.S. PATENT DOCUMENTS

2009/0059850 A1  3/2009  Jun et al.
2009/0233544 A1  9/2009  Oyman et al.
(Continued)

FOREIGN PATENT DOCUMENTS

| EP | 2262330 A1 | 12/2010 |
| WO | WO 2010/076773 A2 | 7/2010 |
| WO | 2010145710 A1 | 12/2010 |

OTHER PUBLICATIONS

Yang, Y. et al., "Relay technologies for WiMAX and LTE-advanced mobile systems," Communications Magazine, IEEE, vol. 47, Issue 10, Oct. 2009, pp. 100-105.

(Continued)

*Primary Examiner* — Opiribo Georgewill
(74) *Attorney, Agent, or Firm* — Turk IP Law, LLC

(57) ABSTRACT

Technologies are generally described for alleviating inter-cell interference experienced by relays in wireless networks such as cellular systems that rely on relays to facilitate some communication between end user devices and base stations (BTSs). A BTS serving a relay may gather information on resource blocks being used to communicate between the relay and an end user. Then, the BTS may send interference indication signals such as High Interference Indicators (HII) or related signals on behalf of sub-communications executed by entities within the cell. Another BTS of a neighboring cell receiving the signals may avoid scheduling on those resource blocks, if possible, thereby relieving the relay link from potentially significant interference.

19 Claims, 7 Drawing Sheets

(56) References Cited

U.S. PATENT DOCUMENTS

| | | |
|---|---|---|
| 2010/0267408 A1 | 10/2010 | Lee et al. |
| 2011/0045856 A1 | 2/2011 | Feng et al. |
| 2011/0081865 A1 | 4/2011 | Xiao et al. |
| 2012/0113816 A1* | 5/2012 | Bhattad et al. ............... 370/246 |
| 2012/0140702 A1* | 6/2012 | Takano ........................ 370/315 |
| 2013/0137364 A1* | 5/2013 | Redana et al. ..................... 455/9 |

OTHER PUBLICATIONS

PCT/US2011/034498 International Search Report and Written Opinion mailed Jun. 7, 2011.

Parkvall et al., "The Evolution of LTE towards IMT-Advanced," Journal of Communications 4, No. 3 (2009): 146.

Wu et al., "Integrated cellular and ad hoc relaying systems: iCAR.," IEEE Journal on Selected Areas in Communications 19, No. 10 (2001): 2105-2115.

Kwan et al., "A Survey of Scheduling and Interference Mitigation in LTE"; Journal of Electrical and Computer Engineering, pp. 10.

Peters et al., "Relay architectures for 3GPP LTE-advanced," EURASIP Journal on Wireless Communications and Networking 2009 (2009): 1-14.

International Preliminary Report on Patentability, issued Oct. 29, 2013, for PCT/US11/34498, Filed Apr. 29, 2011.

* cited by examiner

OPTIMIZING CELL TRAFFIC LOAD AND INTERFERENCE THROUGH HIGH INTERFERENCE INDICATORS

CROSS REFERENCE TO RELATED APPLICATIONS

This Application is the National Stage filing under 35 US.C. §371 of PCT Application Ser. No. PCT/US2011/034498 filed on Apr. 29, 2011. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

Cellular telephone systems are typically pushed to their capacity limits. "Hotspots" (overcrowded cell sites) occur frequently and are difficult to mitigate because they are transient. For example, a downtown area may be a hotspot on a Monday morning, but on a Sunday afternoon the hotspot may be near the little league baseball fields. Subdividing the hotspot and routing traffic to multiple neighboring sites is one approach to increase capacity. However, this is an expensive option, as it leaves any cells that are not currently hotspots with lots of expensive extra capability. Also, much of the challenge with hotspots has to do with providing wireless service to end user equipment (EUs) on the edge of the "hot" cell site due to interference so making all the towers stronger only raises potential interference magnitude.

One approach to meet demand within commercially reasonable budgets is to use relays to relay wireless traffic out of hotspots into neighboring cells or to relay edge traffic closer in to a servicing base station. Traditionally, relays have been fairly simple analog "receive and amplify" devices, which receive a signal and transmit it on to a base station. More sophisticated relays may perform error correction, decoding, or other services traditionally provided by the base station. Some standards such as the latest revision of the mobile network standard LTE (Long Term Evolution) has built-in definitions that allow even relatively simple mobile devices to serve as forwarding relays. Relays, however, often operate at lower power than base stations, have less sophisticated antennas, and/or have a less advantageous vantage relative to the surrounding terrain.

The present disclosure appreciates that there are several limitations with current cellular network technologies. For example, relays are more likely to be subject to interference from neighboring base stations. Thus, attempts to reduce interference experienced by relays by trying to use more power may not be an optimal approach for cellular networks.

SUMMARY

The present disclosure generally describes techniques for optimizing cell traffic load and interference. In some examples, a method for optimizing cell traffic load and interference is described. An example method may include determining resource allocations for communication between an end device and a relay device at a first base station in a first network cell; determining whether any of the resource allocations meet one or more criteria for alerting a second base station in a neighboring second network cell; and transmitting an alert signal from the first base station to the second base station indicating the resource for communication is allocated if at least one of the criteria is met.

In other examples, a base station capable of optimizing cell traffic load and interference based on communications between end devices and relay devices within its network cell is described. An example system may include a communication module for communicating with the end devices and relay devices and a processor coupled to the communication module. The processor may determine resource allocations for communication between an end device and a relay device in the base station's network cell; determine whether any of the resource allocations meet one or more criteria for alerting a second base station in a neighboring network cell; and transmit an alert signal to the second base station indicating the resource for communication is allocated if at least one of the criteria is met.

In further examples, a wireless communication network capable of optimizing cell traffic load and interference based on communications between end devices and relay devices within a network cell is described. An example network may include a plurality of relay devices configured to relay communications from end devices within a proximity of the relay devices to corresponding base stations and a plurality of base stations. Each base station may determine resource allocations for communication between an end device and a relay device in the base station's network cell; determine whether any of the resource allocations meet one or more criteria for alerting a second base station in a neighboring network cell; and transmit an alert signal to the second base station indicating the resource for communication is allocated if at least one of the criteria is met.

In yet other examples, a computer-readable storage medium with instructions stored thereon for optimizing cell traffic load and interference is described. The instructions may cause a method to be performed when executed, where the method includes determining resource allocations for communication between an end device and a relay device at a first base station in a first network cell; determining whether any of the resource allocations meet one or more criteria for alerting a second base station in a neighboring second network cell; and transmitting an alert signal from the first base station to the second base station indicating the resource for communication is allocated if at least one of the criteria is met.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
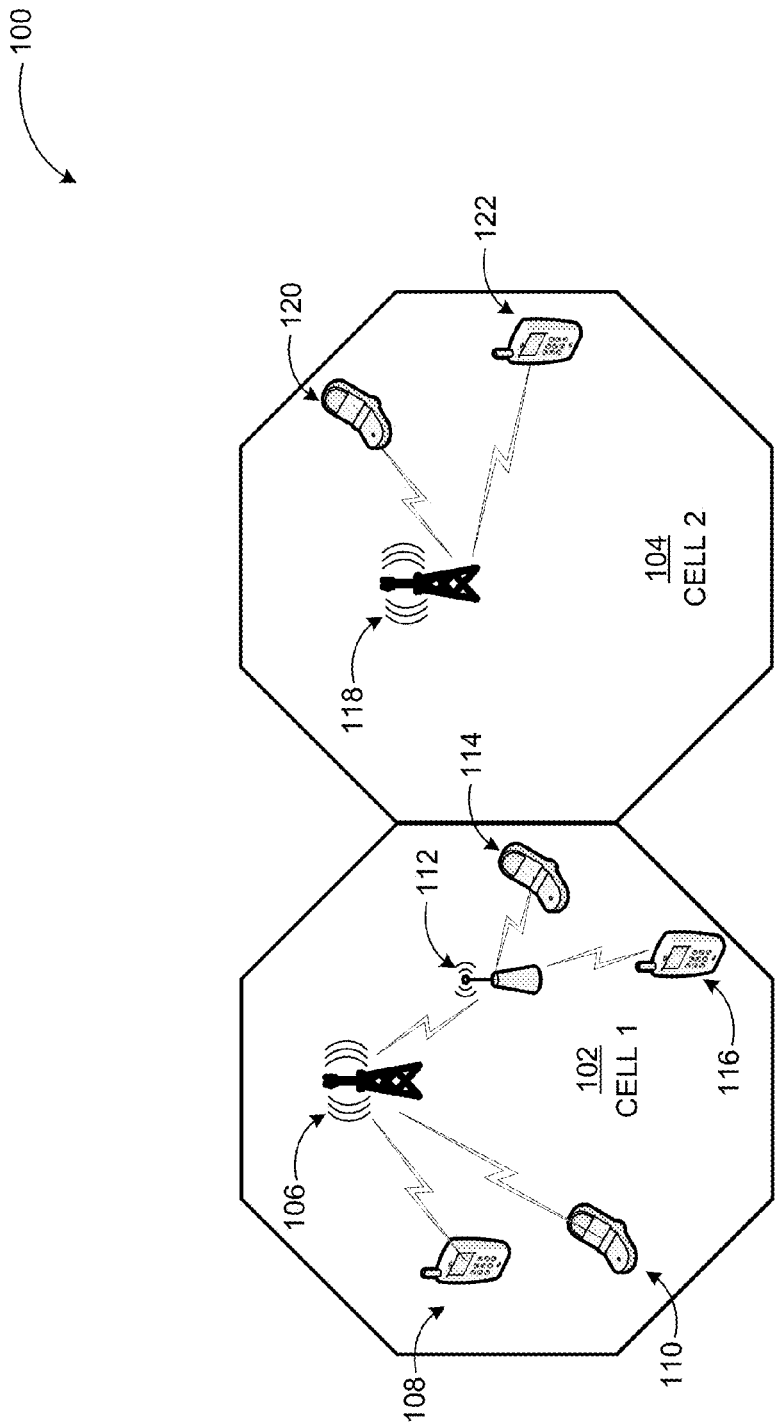
FIG. 1 is a diagram of an illustrative example cellular communication system, where relay devices may be used to facilitate a portion of the communications between base stations and end devices.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to implementing cell traffic load and interference optimization through high interference indicators in cellular and comparable networks.

Briefly stated, embodiments are directed to alleviating inter-cell interference experienced by relays in wireless networks such as cellular systems that rely on relays to facilitate some communication between end user devices and base stations (BTSs). A BTS serving a relay may gather information on resource blocks being used to communicate between the relay and an end user. Then, the BTS may send interference indication signals such as High Interference Indicators (HII) or related signals on behalf of sub-communications executed by entities within the cell. Another BTS of a neighboring cell receiving the signals may avoid scheduling on those resource blocks, if possible, thereby relieving the relay link from potentially significant interference.

FIG. 1 is a diagram of an illustrative example cellular communication system, where relay devices may be used to facilitate a portion of the communications between base stations and end devices arranged in accordance with at least some embodiments described herein.

Some wireless communication networks, specifically cellular communication systems employ "cells" as the network infrastructure. Each cell is typically served by a base station (BTS) that enables end user devices (EUs) to communicate wirelessly with other EUs within the same cell, in other cells, and in other systems (e.g., landline phones, data networks, etc.). Diagram 100 illustrates and example cellular system where the first cell 102 is served by BTS 106 and includes EUs 108, 110, 114, and 116. The neighboring second cell 104 is served by BTS 118 with EUs 120 and 122.

The EUs may include, but are not limited to, stationary communication devices, cellular phones, smart phones, portable computing devices with wireless communication capability, vehicle mount communication devices, and similar ones. In some scenarios, a relay device 112 may be employed to facilitate communication between one or more EUs (e.g., EUs 114 and 116) and their base station (e.g., BTS 106). For example, when the wireless signal is weak in a particular location due to interference, geographic structure, manmade obstructions, etc., a relay device may assist in establishing a reliable link between the base station and the EUs.

In addition to communicating with the EUs, the BTSs may also communicate with other BTSs and/or network management devices (controllers, etc.) exchanging control signals such as inter-cell interference control (ICIC) signals. A system according to embodiments employs ICIC signals between BTSs to alert a neighboring BTS about communications between one or more EUs and a relay such that resource blocks to be used by those are not used by the neighboring cell reducing interference on the relay—EU communications without a need to increase transmission power or take similar measures that may be costly or impractical in some cases.

Figure 2:
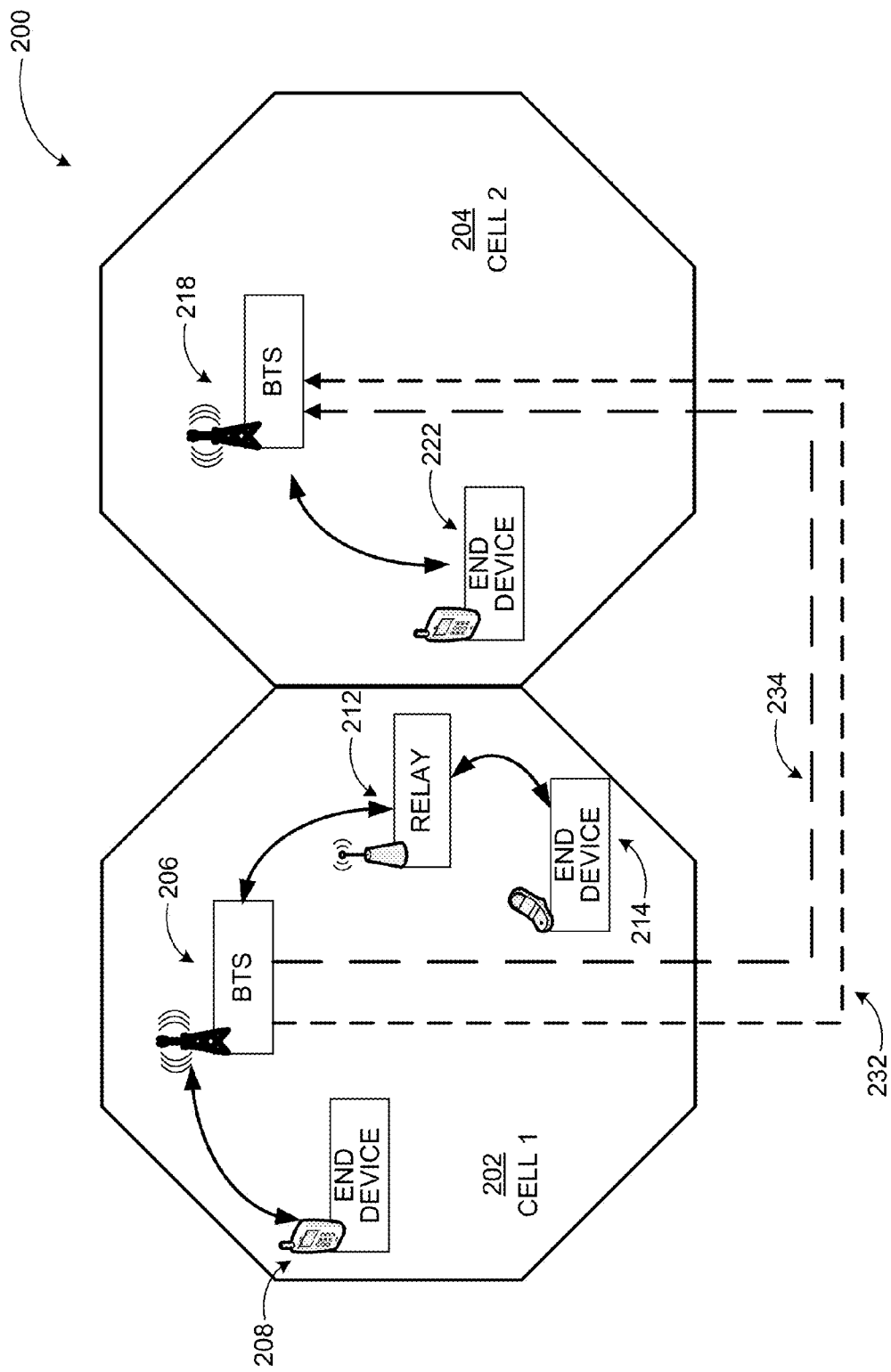
FIG. 2 illustrates two cells of an example cellular communication system, where a base station may communicate resources employed in cell-edge relay-end device communications to a neighboring base station to prevent interference from the neighboring cell.

FIG. 2 illustrates two cells of an example cellular communication system, where a base station may communicate resources employed in cell-edge relay-end device communications to a neighboring base station to prevent interference from the neighboring cell arranged in accordance with at least some embodiments described herein. A system according to embodiments employs signals that may already exist network communication standards (such as LTE standard) but have not been used previously to protect communications by entities within a cell that are not talking directly to a base station. Base station high interference indicator (HII) and/or overload indicator (OI) messages may be used on behalf of communications, in which the base station is not a direct participant. Thus, interference may be reduced for relay communications that may be between lower-power devices with less-advanced antennas, thus making relaying more efficient, less costly, and ultimately a practical method for eliminating hotspots.

Neighboring base stations in advanced networks coordinate spectrum use to reduce interference along their edges. Spectrum coordination in some standardized communications may include exchange of ICIC signals between base stations. ICIC signals may include HII and/or OI signals through a defined interface such as the X2 interface (also known as the "X2 command layer"). The X2 interface may physically be a wireline, fixed microwave, or other connection between two base stations—a connection which does not use the scarce spectrum allocated for communication with EUs. HII may be sent to indicate the base station's intention to schedule cell-edge EUs on specific resource blocks (RBs), which may be thought of as spectrum chunks. OI may be sent to indicate excessive interference in an RB.

Advanced cellular wireless systems, such as Evolved Universal Mobile Telecommunications System Terrestrial Radio Access Network (eUTRAN), Long Term Evolution (LTE), and LTE-Advanced systems include base stations such as BTS 206 and BTS 218 in diagram 200, and relays, such as relay 212. The BTSs provide wireless service to users they are connected to. In the example configuration of diagram 200, BTS 206 is providing service to relay 212 and EU 208 in cell 202 while BTS 218 is providing service to EU 222 in cell 204. The relays, such as relay 212, receive communications from EUs (e.g., EU 214) and relay the communications on to a BTS. The relays may provide other services such as error-correction, transcoding, or other services traditionally provided by BTS. Relay 212 may be specialized equipment or just a user cell phone which is also providing a relay function, possibly without even notifying the user. As shown in diagram 200, BTS 218's communications with EU 222 have the potential to interfere with EU 214's communications with relay 212.

BTS 206 may inform BTS 218 via an HII signal 232 (and/or an OI signal 234) so that BTS 218 does not transmit potentially interfering radio frequency signals to other end users in the direction of EU 222 in a resource block, which BTS 206 intends to assign to EU 214. The control signals may be part of a standard such as the LTE specification. In cases of a simple store and forward, for example, the EU and relay may engage in resource block (RB) allocation using the same standards as the BTS uses to communicate with EU. Those allocation messages may be forwarded along with the others to the BTS, although an identification block ID would normally cause the BTS to ignore them. By recognizing that the ID block is that of the relay which the BTS is servicing, the BTS can ascertain the RBs that the relay and EU will be using and the BTS may be able to send HII and/or OI signals on their behalf. If the relay is acting as a repeater (no storage), the BTS may have the resource block information as well and may only need to adjust the timing for the relay delay.

Figure 3:
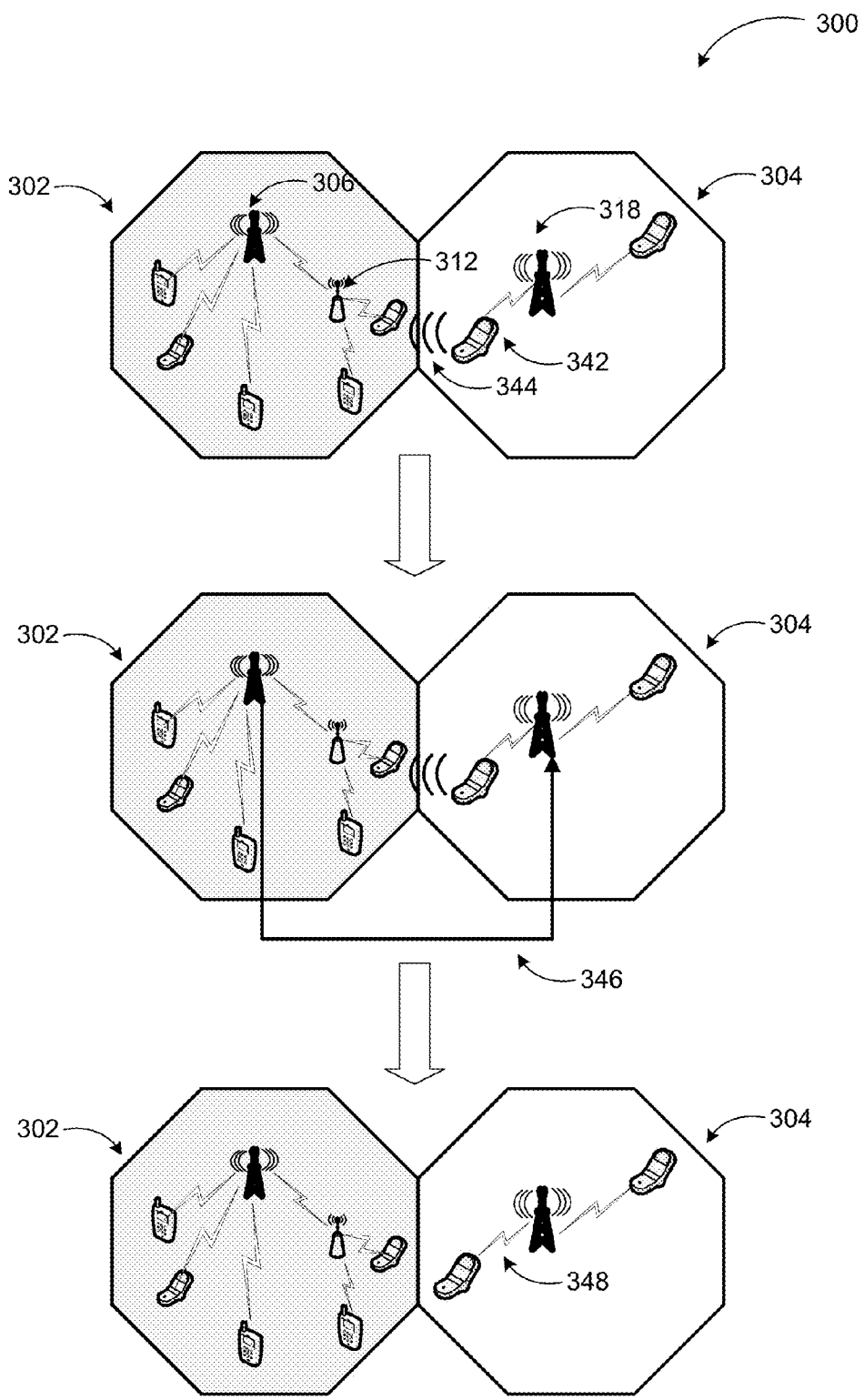
FIG. 3 illustrates conceptually prevention of neighboring cell interference by communication between base stations about resource allocation for communications between end devices and relay devices.

FIG. 3 illustrates conceptually prevention of neighboring cell interference by communication between base stations about resource allocation for communications between end devices and relay devices arranged in accordance with at least some embodiments described herein.

Diagram 300 illustrates three main phases in an example scenario according to some examples. In the first phase, BTS 306 of cell 302 services a number of EUs and relay 312, which itself may service a number of other EUs. BTS 318 in neighboring cell 304 also services a number of EUs, among them EU 342. EU 342's communication with BTS 318 (344) may potentially interfere with the communication between relay 312 and its EUs. Thus, in the second phase of the example scenario, BTS 306 of cell 302 determines resource block allocations for the communication between relay 312 and its EUs, and sends an HII or OI signal 346 to BTS 318 of cell 304 alerting BTS 318 that the indicated resource blocks are/will be used within cell 302.

In the third phase of the example scenario, BTS 318 recognizes that the indicated resource blocks are in use at the edge of the neighboring cell and uses other resource blocks for its communication 348 with EU 342, thereby avoiding interference to the communication between relay 312 and its EUs in the neighboring cell.

In some embodiments, existing X2 interface may be used to send new HII signals on behalf of subsidiary communications between a relay and an EU using the relay. These new signals may be indistinguishable from existing base-station traffic HIIs from the point of view of the receiving base station allowing backwards compatibility for existing equipment while enhancing the operating environment for relays. Relay traffic resource block (RB) allocation can be determined through relayed requests that have the ID of the relay for forwarding relays or via explicit control signals for more advanced relays.

As indicated above, both the existing and the new ICIC signaling between neighboring base stations may take place through the existing X2 interface. The existing ICIC signaling may include an HII sent by BTS 306 to indicate the RBs which BTS 306 intends to allocate for use in the BTS 306—relay 312 communication session. This information may allow BTS 318 to allocate different non-interfering RBs for use in the BTS 318—EU 342 communication session, to the extent that the BTS 318—EU 342 communication session may even interfere with the BTS 306—relay 312 communication session. However, the existing ICIC signaling does not include information regarding which RBs have been or will be allocated to the communication session between the relay 312 and its EUs, despite the fact that the relay—EU communication session is closer to BTS 318 and is more likely to be subject to interference by the BTS 318—EU 342 communication session. By using the ICIC signaling between base stations to indicate resource block allocations between relay—EU communications, the potential interference from the neighboring cell may be reduced or avoided without having to modify relay or EU configurations.

Embodiments may be implemented via combinations of hardware and software components. The software components may include existing or new ICIC or similar signaling systems, proposed to communicate information regarding EU—relay communication sessions. Moreover, embodiments are not limited to cellular phone systems, but may be implemented in any wireless network system that employs a cellular infrastructure with control communications between base stations.

While embodiments have been discussed above using specific examples, components, scenarios, and configurations in FIG. 1 through FIG. 3, they are intended to provide a general guideline to be used for implementing cell traffic load and interference optimization through high interference indicators. These examples do not constitute a limitation on the embodiments, which may be implements using other components, optimization schemes, and configurations using the principles described herein. For example, other algorithms may be implemented than those provided as example for determining if any resource block allocations meet a criterion for sending an inter-cell interference control signal, and the like.

Figure 4:
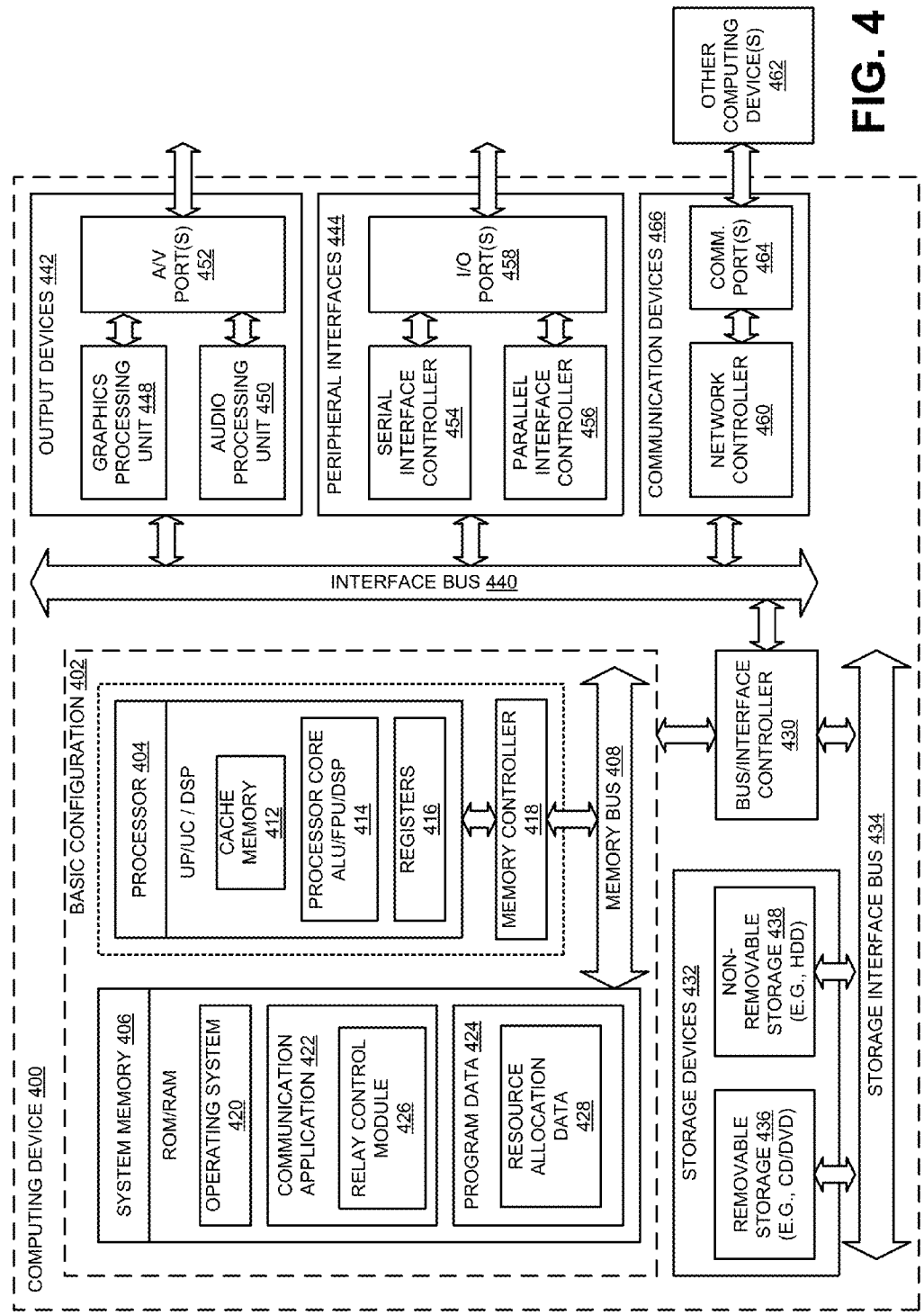
FIG. 4 illustrates a general purpose computing device, which may be used to implement cell traffic load and interference optimization through high interference indicators.

FIG. 4 illustrates a general purpose computing device, which may be used to implement cell traffic load and interference optimization through high interference indicators in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level cache memory 412, a processor core 414, and registers 416. Example processor core 414 may include an arithmetic logic unit (ALU), a floating point unit (FPU), a digital signal processing core (DSP Core), or any combination thereof. An example memory controller 418 may also be used with processor 404, or in some implementations memory controller 414 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more communication applications 422, and program data 424. Communication application 422 may include a relay control module 426 that is arranged to gather information on resource blocks being used to communicate between a relay and an end user. Then, the communication application 422 may send interference indication signals such as High Interference Indicators (HII) or related signals on behalf of sub-communications executed by entities within the cell. Another communication application of a neighboring cell base station receiving the signals may avoid scheduling on those resource blocks, if possible, thereby relieving the relay link from potentially significant interference and any other processes, as discussed above. Program data 424 may include one or more of resource allocation data 428 (e.g. frequencies of available channels, active end users, etc.) and similar data as discussed above in conjunction with at least FIG. 1 through 3. This data may be useful for mitigating inter-cell interference as is described herein. In some embodiments, communication application 422 may be arranged to operate with program data 424 on operating system 420 such that traffic load is optimized as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 466 to basic configuration 402 via bus/interface controller 430. Example output devices 442 include a graphics processing unit 448 and an audio processing unit 440, which may be configured to communicate to various external devices such as a display or speakers via one or more A/V ports 442. Example peripheral interfaces 444 include a serial interface controller 444 or a parallel interface controller 446, which may be configured to communicate with external devices such as input devices (e.g., keyboard, mouse, pen, voice input device, touch input device, etc.) or other peripheral devices (e.g., printer, scanner, etc.) via one or more I/O ports 448. An example communication device 466 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a physical server, virtual server, a computing cloud, or a hybrid device that include any of the above functions. Computing device 400 may also be implemented as a personal computer including both laptop computer and non-laptop computer configurations. Moreover computing device 400 may be implemented as a networked system or as part of a general purpose or specialized server.

Networks for a networked system including computing device 400 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 5:
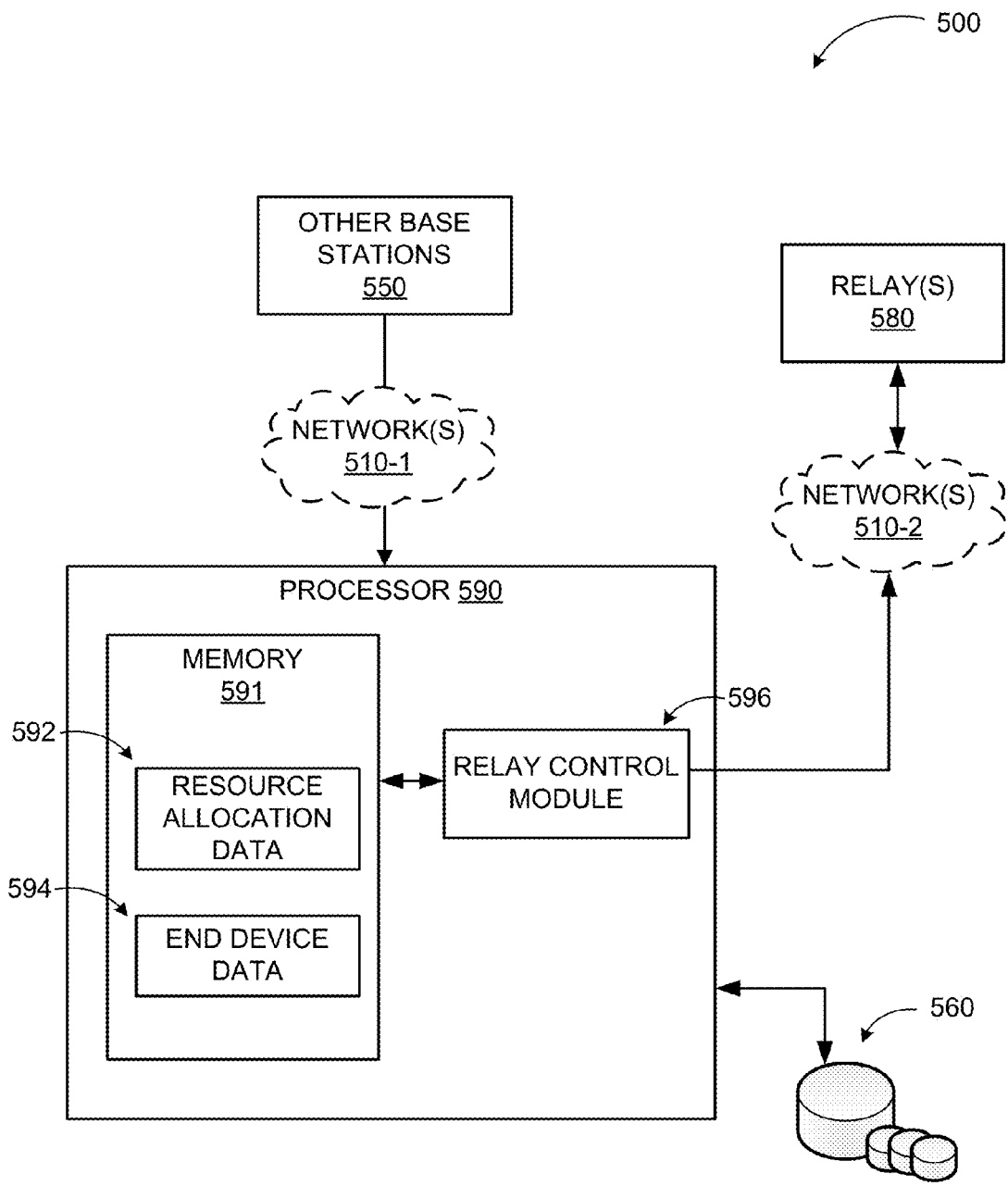
FIG. 5 illustrates a special purpose processor, which may be used to implement cell traffic load and interference optimization through high interference indicators.

FIG. 5 illustrates a special purpose processor, which may be used to implement cell traffic load and interference optimization through high interference indicators in accordance with at least some embodiments described herein. Processor 590 in diagram 500 may be part of a computing device that is communicatively coupled to one or more relays 580, which may facilitate communication with end user devices through network(s) 510-2. Processor 590 may also communicate with data source 560 storing network related information. Processor 590 may be part of a control system of a base station and facilitate communication with other base stations 550 through network(s) 510-1 for coordinating network communications such as exchanging inter-cell interference control (ICI) signals.

Processor 590 may include a number of processing modules such as relay control module 596. Resource allocation data 592 and end device data 594 may be used by processor 590 in conjunction with relay control module 596 for determining if any resource block allocations between end user devices and relays meet criteria for sending an ICIC signal to a neighboring base station and if so, sending the ICIC signal such that the neighboring base station can minimize interference for the relay that is being used. Resource allocation data 592 and end device data 594 may be stored during processing in memory 591, which may be a cache memory of the processor 590 or in an external memory (e.g., memory external to processor 590).

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 6:
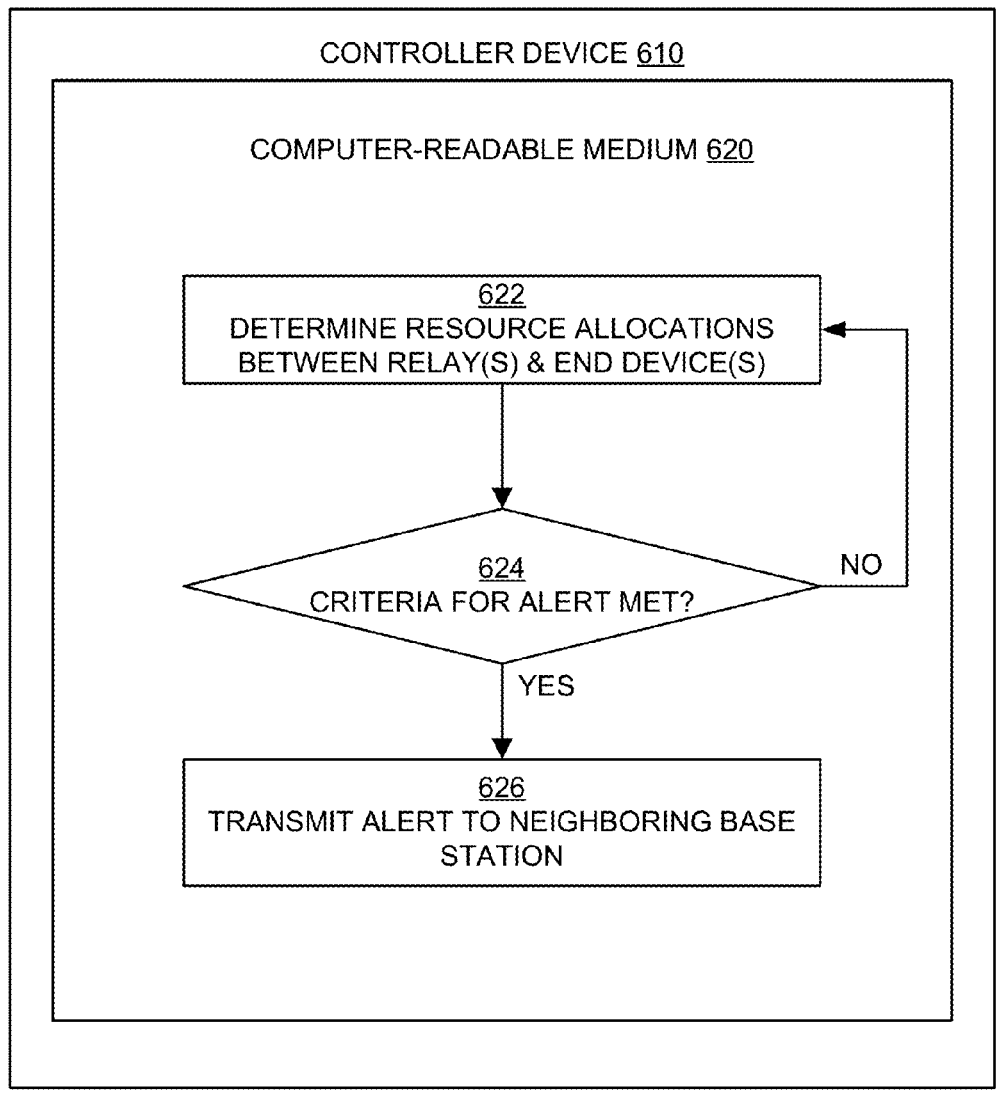
FIG. 6 is a flow diagram illustrating an example method for employing high interference indicators and overload indicators to reduce neighboring cell interference that may be performed by a computing device such as device 400 in FIG. 4 or a special purpose processor such as processor 590 of FIG. 5.

FIG. 6 is a flow diagram illustrating an example method for employing high interference indicators and overload indicators to reduce neighboring cell interference that may be performed by a computing device such as device 400 in FIG. 4 or a special purpose processor such as processor 590 of FIG. 5. Thus, controller device 610 may be embodied as computing device 400, special purpose processor 590, or similar devices executing instructions stored in computer-readable medium 620 for performing the method. A process of optimizing cell traffic load and interference through high interference indicators may include one or more operations, functions or actions as is illustrated by one or more of blocks 622, 624, and/or 626.

Some example processes may begin with operation 622, "DETERMINE RESOURCE ALLOCATIONS BETWEEN RELAY(S) AND END DEVICE(S)". At operation 622, a base station may gather information on resource blocks being used to communicate between a relay and an end user device within its cell. Operation 622 may be followed by decision operation 624, "CRITERIA FOR ALERT MET?" At decision operation 624, the processor (e.g. processor 590) may make a determination whether any of the resource block allocations between EUs and relays meet the criteria for sending an ICIC signal to a neighboring BTS. If the criteria are not met, the processor may continue gathering information on resource block allocations.

If the criteria for sending an ICIC signal to a neighboring BTS are determined to be met at operation 624, the processor may send one or more interference indication signals such as High Interference Indicators (HII), overload indicators (OI), or related signals on behalf of sub-communications executed by entities within the cell at operation 626, "TRANSMIT ALERT TO NEIGHBORING BASE STATION." Another BTS of a neighboring cell receiving the signals may avoid scheduling on those resource blocks, if possible, thereby relieving the relay link from potentially significant interference.

The operations included in the process of FIG. 6 described above are for illustration purposes. Implementing cell traffic load and interference optimization through high interference indicators may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 7:
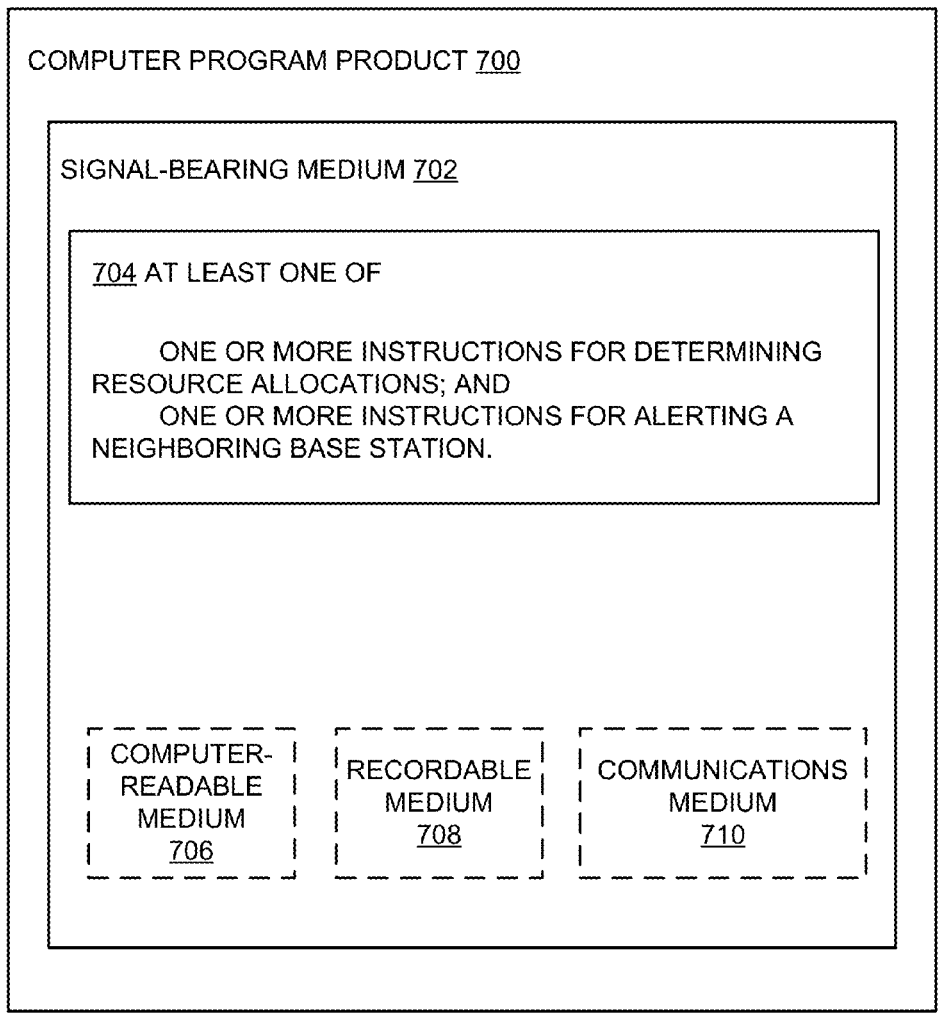
FIG. 7 illustrates a block diagram of an example computer program product for implementing cell traffic load and interference optimization through high interference indicators.

FIG. 7 illustrates a block diagram of an example computer program product to be used for implementing cell traffic load and interference optimization through high interference indicators in accordance with at least some embodiments described herein. In some examples, as shown in FIG. 7, computer program product 700 may include a signal bearing medium 702 that may also include machine readable instructions 704 that, when executed by, for example, a processor, may provide the functionality described above with respect to FIG. 1 through FIG. 3. Thus, for example, referring to processor 590, one or more of the tasks shown in FIG. 7 may be undertaken in response to instructions 704 conveyed to the processor 590 by medium 702 to perform actions associated with optimizing cell traffic load and interference through high interference indicators as described herein. Some of those instructions may include determining resource allocations and alerting a neighboring base station using one or more algorithms as described previously.

In some implementations, signal bearing medium 702 depicted in FIG. 7 may encompass a computer-readable medium 706, such as, but not limited to, a hard disk drive, a Compact Disc (CD), a Digital Versatile Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, computer program product 700 may be conveyed to the processor 704 by an RF signal bearing medium 702, where the signal bearing medium 702 is conveyed by a wireless communications medium 710 (e.g., a wireless communications medium conforming with the IEEE 802.11 standard).

The present disclosure generally describes techniques for optimizing cell traffic load and interference. In some examples, a method for optimizing cell traffic load and interference is described. An example method may include determining resource allocations for communication between an end device and a relay device at a first base station in a first network cell; determining whether any of the resource allocations meet one or more criteria for alerting a second base station in a neighboring second network cell; and transmitting an alert signal from the first base station to the second base station indicating the resource for communication is allocated if at least one of the criteria is met.

The method may further include determining the resource allocations based on information received from the relay device within the first network cell and/or determining the resource allocations assigning resource blocks to the communication between the end device and the relay device within the first network cell at the first base station. The end device and the relay device may employ the same standard for resource allocation as the first base station uses to communicate with end device, and a resource allocation message may be forwarded along with other communications to the first base station. The first base station may ascertain the resource allocations to be used by the relay device and the end device by recognizing an identifier block in the resource allocation message as belonging to the relay device associated with the first base station.

According to other examples, the method may also include adjusting a timing of a relay device delay at the first base station if the relay device is acting as a repeater and/or transmitting the alert signal from the first base station to the second base station employing inter-cell interference control (ICIC) protocol in a cellular network. The alert signal may include at least one of a high interference indicator (HII) and/or an overload indicator (OI), where the HII indicates the first base station's intent to schedule a cell-edge end device on specific resource blocks and the OI indicates excessive interference in a specific resource block.

According to further examples, the method may include transmitting the alert signal from the first base station to the second base station through a communication channel other than a cellular communication channel used by the base stations to communicate with end devices. The alert signal may be transmitted from the first base station to the second base station via an X2 command layer interface, where the X2 interface includes a wired connection or a fixed microwave connection between the first and second base stations. The end device may include a cellular phone, a smart phone, a computing device equipped with cellular communication capability, or a specialized device equipped with cellular communication capability. The relay device may include a special purpose relay device or an end device configured to act as a relay in addition to providing communication services to a user. The end device configured to act as a relay may provide the relay services in a transparent manner to the user. Moreover, the first and second base stations may be part of one of a eUTRAN network, an LTE network, and an LTE-Advanced network.

In other examples, a controller for a base station capable of optimizing cell traffic load and interference based on communications between end devices and relay devices within its network cell is described. An example controller may include a communication module for communicating with the end devices and relay devices and a processor coupled to the communication module. The processor may determine resource allocations for communication between an end device and a relay device in the base station's network cell; determine whether any of the resource allocations meet one or more criteria for alerting a second base station in a neighboring network cell; and transmit an alert signal to the second base station indicating the resource for communication is allocated if at least one of the criteria is met.

The processor may also determine the resource allocations based on information received from the relay device within the base station's network cell and/or determine the resource allocations by assigning resource blocks to the communication between the end device and the relay device within the base station's network cell at the base station. The end device and the relay device may employ the same standard for resource allocation as the base station uses to communicate with end device, and a resource allocation message may be forwarded along with other communications to the base station from the relay device. The base station may ascertain the resource allocations to be used by the relay device and the end device by recognizing an identifier block in the resource allocation message as belonging to the relay device associated with the base station.

According to some examples, the processor may further adjust a timing of a relay device delay at the base station if the relay device is acting as a repeater and/or transmit the alert signal to the second base station employing inter-cell interference control (ICIC) protocol in a cellular network. The alert signal may include at least one of a high interference indicator (HII) and/or an overload indicator (OI), the HII indicating the base station's intent to schedule a cell-edge end device on specific resource blocks and the OI indicating excessive interference in a specific resource block.

According to further examples, the processor may transmit the alert signal to the second base station through a communication channel other than a cellular communication channel used by the base stations to communicate with the end devices. The alert signal may be transmitted to the second base station via an X2 command layer interface that includes one of a wired connection and a fixed microwave connection between the base stations. The relay device may be configured to perform at least one from a set of: relaying communications from end devices to the base station, storing at least a portion of the relayed communications, storing one or more parameters associated with the relayed communications, error correction, and/or transcoding. The controller may be integrated into a base station that is part of a eUTRAN network, an LTE network, or an LTE-Advanced network.

In further examples, a wireless communication network capable of optimizing cell traffic load and interference based on communications between end devices and relay devices within a network cell is described. An example network may include a plurality of relay devices configured to relay communications from end devices within a proximity of the relay devices to corresponding base stations and a plurality of base stations. Each base station may determine resource allocations for communication between an end device and a relay device in the base station's network cell; determine whether any of the resource allocations meet one or more criteria for alerting a second base station in a neighboring network cell; and transmit an alert signal to the second base station indicating the resource for communication is allocated if at least one of the criteria is met.

Each base station may further determine the resource allocations when a communication occurs between the end device and the relay device within the base station's network cell and/or determine the resource allocations when a communication between the end device and the relay device within the base station's network cell is about to be relayed to the base station. The end devices and the relay devices may employ the same standard for resource allocation as the base stations use to communicate with end devices, and a resource allocation message is forwarded along with other communications to the corresponding base stations from the relay devices. The base stations may ascertain the resource allocations to be used by the relay devices and the end devices by recognizing an identifier block in the resource allocation message as belonging to a relay device associated with a corresponding base station.

According to some examples, each base station may further adjust a timing of a relay device delay if the relay device is acting as a repeater and/or transmit the alert signal to the second base station employing inter-cell interference control (ICIC) protocol. The alert signal may include at least one of a high interference indicator (HII) and/or an overload indicator (OI), the HII indicating a base station's intent to schedule a cell-edge end device on specific resource blocks and the OI indicating excessive interference in a specific resource block. Each base station may also transmit the alert signal to the second base station through a communication channel other than a cellular communication channel used by the base stations to communicate with the end devices.

In yet other examples, a computer-readable storage medium with instructions stored thereon for optimizing cell traffic load and interference is described. The instructions may cause a method to be performed when executed, where the method includes determining resource allocations for communication between an end device and a relay device at a first base station in a first network cell; determining whether any of the resource allocations meet one or more criteria for alerting a second base station in a neighboring second network cell; and transmitting an alert signal from the first base station to the second base station indicating the resource for communication is allocated if at least one of the criteria is met.

The method may further include determining the resource allocations based on information received from the relay device within the first network cell and/or determining the resource allocations by assigning resource blocks to the communication between the end device and the relay device within the first network cell at the first base station. The end device and the relay device may employ the same standard for resource allocation as the first base station uses to communicate with end device, and a resource allocation message may be forwarded along with other communications to the first base station. The first base station may ascertain the resource allocations to be used by the relay device and the end device by recognizing an identifier block in the resource allocation message as belonging to the relay device associated with the first base station.

According to some examples, the method may also include adjusting a timing of a relay device delay at the first base station if the relay device is acting as a repeater and/or transmitting the alert signal from the first base station to the second base station employing inter-cell interference control (ICIC) protocol in a cellular network. The alert signal may include at least one of a high interference indicator (HII) and/or an overload indicator (OI), where the HII indicates the first base station's intent to schedule a cell-edge end device on specific resource blocks and the OI indicates excessive interference in a specific resource block.

The method may further include transmitting the alert signal from the first base station to the second base station through a communication channel other than a cellular communication channel used by the base stations to communicate with end devices. The alert signal may be transmitted from the first base station to the second base station via an X2 command layer interface, where the X2 interface includes a wired connection or a fixed microwave connection between the first and second base stations.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g.,"a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for optimizing cell traffic load and interference, the method comprising:
    recognizing a resource allocation message forwarded from a relay device at a first base station, the resource allocation message providing information about one or more resource blocks used for communication between the relay device and an end device within a first network cell;
    determining resource allocations for communication between the end device and the relay device at the first base station in the first network cell based on the information provided in the resource allocation message;
    determining whether any of the resource allocations meet one or more criteria for alerting a second base station in a neighboring second network cell; and
    in response to a determination that at least one of the criteria is met, transmitting an alert signal from the first base station to the second base station on behalf of the communication between the end device and the relay device indicating the resource is allocated for communication between the end device and the relay device in the first network cell.

2. The method according to claim 1, further comprising:

determining the resource allocations by assigning the one or more resource blocks to the communication between the end device and the relay device within the first network cell at the first base station based on the information provided in the resource allocation message, wherein the end device and the relay device employ a same standard for resource allocation as the first base station uses to communicate with end device, and the resource allocation message is forwarded along with other communications to the first base station.

3. The method according to claim 1, further comprising: transmitting the alert signal from the first base station to the second base station employing inter-cell interference control (ICIC) protocol in a cellular network, wherein the alert signal includes at least one of a high interference indicator (HII) and/or an overload indicator (OI), the HII indicating the first base station's intent to schedule a cell-edge end device on specific resource blocks and the OI indicating excessive interference in a specific resource block.

4. The method according to claim 1, further comprising: transmitting the alert signal from the first base station to the second base station through a communication channel other than a cellular communication channel used by the base stations to communicate with end devices.

5. The method according to claim 1, wherein the alert signal is transmitted from the first base station to the second base station via an X2 command layer interface, the X2 interface including one of a wired connection and a fixed microwave connection between the first and second base stations.

6. The method according to claim 1, wherein the end device configured to act as a relay provides relay services in a transparent manner to a user.

7. A controller for a base station capable of optimizing cell traffic load and interference based on communications between end devices and relay devices within its network cell, the controller comprising:
one or more relays for communicating with the end devices and relay devices; and
a processor communicatively coupled to the one or more relays through relay control hardware of the processor, the processor adapted to:
recognize a resource allocation message forwarded from a relay device at the base station, the resource allocation message providing information about one or more resource blocks used for communication between the relay device and an end device within the base station's network cell;
determine resource allocations for communication between the end device and the relay device in the base station's network cell based on the information provided in the resource allocation message;
determine whether any of the resource allocations meet one or more criteria for alerting a second base station in a neighboring network cell; and
in response to a determination that at least one of the criteria is met, transmit an alert signal from the base station to the second base station indicating the resource is allocated for communication between the end device and the relay device in the base station's network cell, wherein the alert signal is transmitted by the base station on behalf of the communication between the end device and the relay device, as the base station is not a direct participant in the communication.

8. The controller according to claim 7, wherein the base station ascertains the resource allocations to be used by the relay device and the end device by recognizing an identifier block in the resource allocation message as belonging to the relay device associated with the base station.

9. The controller according to claim 7, wherein the processor is further adapted to:
transmit the alert signal to the second base station employing inter-cell interference control (ICIC) protocol in a cellular network, wherein the alert signal includes at least one of a high interference indicator (HII) and/or an overload indicator (OI), the HII indicating the base station's intent to schedule a cell-edge end device on specific resource blocks and the OI indicating excessive interference in a specific resource block.

10. The controller according to claim 9, wherein the processor is further adapted to:
transmit the alert signal to the second base station through a communication channel other than a cellular communication channel used by the base stations to communicate with the end devices via an X2 command layer interface that includes one of a wired connection and a fixed microwave connection between the base stations.

11. The controller according to claim 7, wherein the end device includes one of a cellular phone, a smart phone, a computing device equipped with cellular communication capability, or a specialized device equipped with cellular communication capability and the relay device includes one of a special purpose relay device or an end device configured to act as a relay in addition to providing communication services to a user.

12. The controller according to claim 7, wherein the relay device is configured to perform at least one from a set of: relaying communications from end devices to the base station, storing at least a portion of the relayed communications, storing one or more parameters associated with the relayed communications, error correction, and/or transcoding.

13. A wireless communication network capable of optimizing cell traffic load and interference based on communications between end devices and relay devices within a network cell, the network comprising:
a plurality of relay devices configured to relay communications from end devices within a proximity of the relay devices to corresponding base stations;
a plurality of base stations, each base station adapted to:
recognize a resource allocation message forwarded from a relay device, the resource allocation message providing information about one or more resource blocks used for communication between the relay device and an end device within the base station's network cell, wherein the resource allocation message is recognized by the base station through an identification block of the relay device;
determine resource allocations for communication between an end device and a relay device in the base station's network cell based on the information provided in the resource allocation message;
determine whether any of the resource allocations meet one or more criteria for alerting a second base station in a neighboring network cell; and
in response to a determination that at least one of the criteria is met, transmit an alert signal from the base station to the second base station indicating the resource is allocated for communication between the end device and the relay device in the base station's network cell, wherein the alert signal is transmitted by the base station on behalf of the communication between the end device and the relay device, as the base station is not a direct participant in the communication.

14. The wireless communication network according to claim 13, wherein each base station is further adapted to:
determine the resource allocations by assigning the one or more resource blocks to the communication between the end device and the relay device within the base station's network cell at the base station.

15. The wireless communication network according to claim 13, wherein each base station is further adapted to:
adjust a timing of a relay device delay if the relay device is acting as a repeater.

16. The wireless communication network according to claim 13, wherein each base station is further adapted to:
transmit the alert signal to the second base station employing inter-cell interference control (ICIC) protocol, wherein the alert signal includes at least one of a high interference indicator (HII) and/or an overload indicator (OI), the HII indicating a base station's intent to schedule a cell-edge end device on specific resource blocks and the OI indicating excessive interference in a specific resource block.

17. The wireless communication network according to claim 16, wherein each base station is further adapted to:
transmit the alert signal to the second base station through a communication channel other than a cellular communication channel used by the base stations to communicate with the end devices station via an X2 command layer interface that includes one of a wired connection and a fixed microwave connection between the base stations.

18. The wireless communication network according to claim 13, wherein the relay device is configured to perform at least one from a set of: relaying communications from end devices to a corresponding base station, storing at least a portion of the relayed communications, storing one or more parameters associated with the relayed communications, error correction, and/or transcoding.

19. The wireless communication network according to claim 13, wherein the network is one of a eUTRAN network, an LTE network, and an LTE-Advanced network.

* * * * *